UNITED STATES PATENT OFFICE.

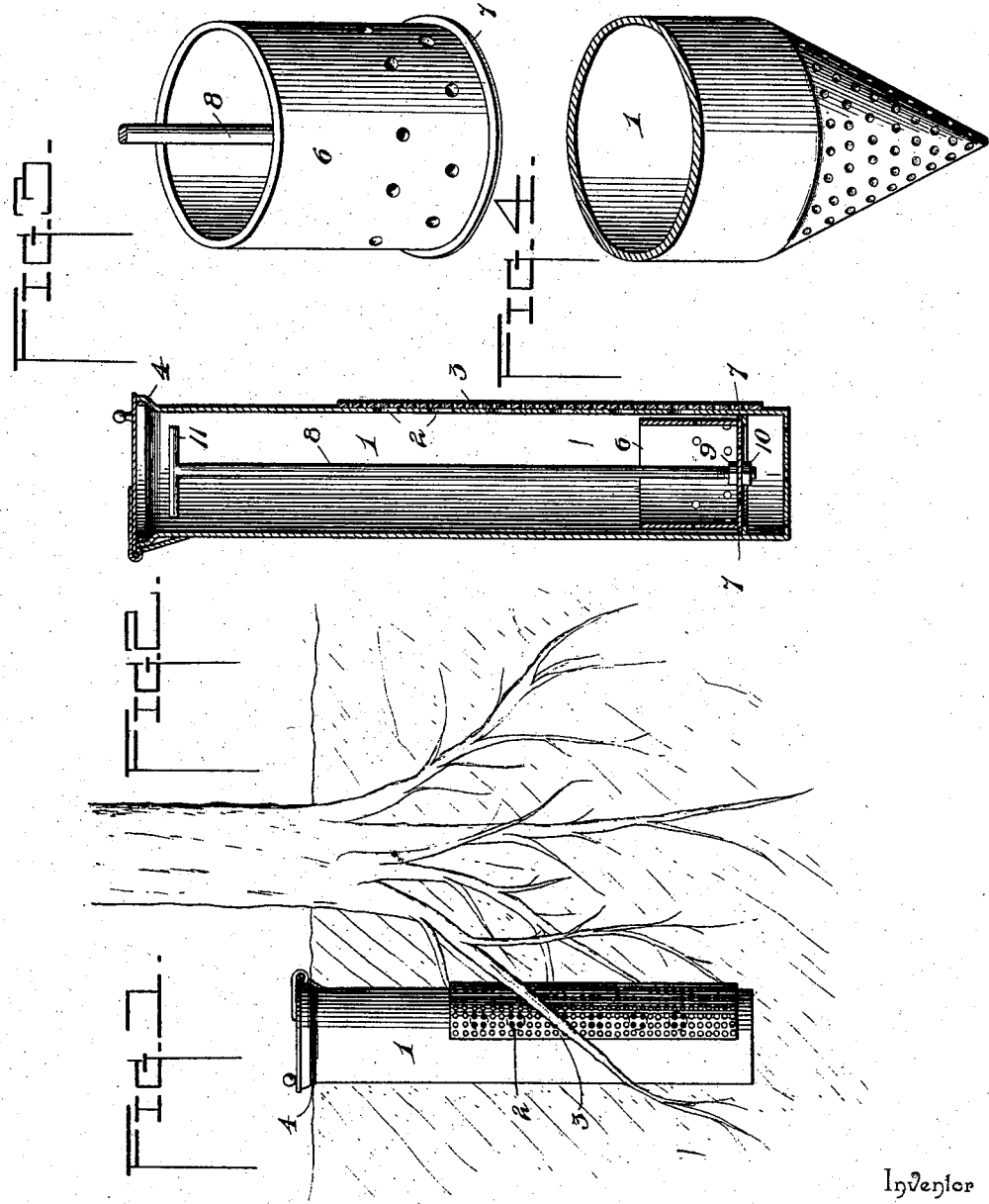

HERMAN KLING, OF LARNED, KANSAS.

TREE-IRRIGATOR.

SPECIFICATION forming part of Letters Patent No. 588,278, dated August 17, 1897.

Application filed February 25, 1897. Serial No. 624,988. (No model.)

*To all whom it may concern:*

Be it known that I, HERMAN KLING, a citizen of the United States, residing at Larned, in the county of Pawnee and State of Kansas, have invented a new and useful Tree-Irrigator, of which the following is a specification.

My invention relates to irrigating devices for trees and shrubbery, and has for its object to provide an irrigating-tube adapted to be arranged contiguous to a tree or shrub to convey water to a point contiguous to the roots thereof, said tube being provided with means whereby accumulations of dirt—such as soil, leaves, twigs, and the like, which may enter the tube through its upper end or through the perforations provided for the escape of the contents—may be withdrawn with facility to avoid choking the outlet-perforations and preserve the apparatus in operative condition.

Further objects and advantages of this invention will appear in the following description, and the novel features thereof will be particularly pointed out in the appended claims.

In the drawings, Figure 1 is a view of an irrigating device constructed in accordance with my invention arranged in operative position with relation to a tree-trunk. Fig. 2 is central sectional view of the irrigator. Fig. 3 is a detail view of the dirt receptacle or bucket detached. Fig. 4 is a view of the lower end of an irrigating-tube, which is pointed or reduced to facilitate its insertion into the soil.

Similar numerals of reference indicate corresponding parts in all the figures of the drawings.

1 designates a tube, of uniform diameter throughout, which is provided at its lower end and at one side, the latter being adapted to be placed toward the tree or shrub to be watered, with perforations adapted to allow the escape of the contents. In the construction illustrated the shell of the tube is provided with large openings 2, covered by a screen 3, of foraminous or reticulated construction, to prevent the roots of the tree or shrub from penetrating to the interior of the tube, this construction being preferred when the body of the tube is constructed of sheet metal, whereas when the tube is constructed of cast metal the fine perforations may be formed directly therein.

The upper end of the tube is provided with a shoulder or enlargement 4, to facilitate the withdrawal of the tube from the soil when such operation is desired, and a hinged lid or cover is provided to close said upper end and prevent, as far as possible, the entrance of dirt, such as leaves.

Fitted in the tube is a dirt receptacle or bucket 6, preferably flanged at its lower end, as shown at 7, and arranged to rest upon a support on the wall of the tube contiguous to the bottom of the latter, said support, in the construction illustrated, consisting of an inwardly-extending ledge. This support maintains the bottom of the receptacle out of contact with the perforated bottom of the tube.

The receptacle is perforated in its bottom and sides, the openings being of small diameter sufficient to allow the liquid contents of the tube to pass therethrough without permitting dirt which may be received therein to escape, and attached to the bucket is a stem or rod 8, held in place at its lower end by coöperating nuts 9 and 10 and terminating at its upper end in a handhold or crossbar 11, the length of the stem or rod being such as to allow the handhold or cross-bar to be arranged below the plane of the top or cover when the receptacle is arranged upon the support at the bottom of the tube.

From the above description it will be seen that when fine earth, leaves, and other obstructions gain access to the interior of the tube they are caught by the receptacle and may be readily withdrawn therefrom to maintain the interior of the tube in condition to receive water and allow the same to pass freely through the perforations provided for that purpose. It is unnecessary when a receptacle of the construction described is employed to remove the tube at intervals in order to clean its interior.

It is obvious that the tube may be arranged at an inclination to carry the water from a point somewhat remote from the trunk of the tree approximately to a point under said trunk, in which case the lid or cover thereof will be disposed to occupy a position in the plane of or parallel with the surface of the soil.

It will be obvious, furthermore, that while the use of upper and lower nuts 9 and 10 to connect the bucket or receptacle to the shank or stem is preferable by reason of allowing for linear adjustment of said shank or stem to arrange the upper extremity of the handle at the desired distance from the plane of the lid or cover, the upper nut may be dispensed with by providing the rod with a shoulder to bear upon the bottom of the receptacle, this construction not having been illustrated, as it is common in various arts to so construct a part which it is desired to detachably connect to another. Furthermore, it will be understood that the cross-bar construction of the handle is not indispensable, but is employed in the construction illustrated as providing a substantial handhold of which all of the points are at a common distance from the plane of the lid or cover, and which, therefore, can be readily grasped when it is desired to remove the bucket without interfering with the introduction of water for irrigating purposes.

In practice it is frequently desirable to arrange a series of tubes in communication with a water-supply conveyer or conduit or in position to receive water from a stream, particularly when a row or large number of trees or plants are to be watered, and the lids or covers are preferably made water-tight to provide for excluding water when not required, such exclusion being desirable to prevent water from flowing into near tubes, or those located nearer to the source of supply, until after the remote tubes, or those located farther from the source, have received their proper supply. It is also preferable to hinge the lid or cover at the perforated side of the tube, whereby it opens from the direction in which the water is supplied, to avoid disposing the lid or cover as an obstruction to the entrance of the water, particularly when the latter is supplied by an open stream or its equivalent. The extent of the perforated side of the tube may be varied to suit the kind of tree or plant in connection with which it is to be used, the drawing, however, showing perforations extending approximately for two-thirds of the length of the tube from its bottom upward.

Various other changes in the form, proportion, and the minor details of construction may be resorted to without departing from the spirit or sacrificing any of the advantages of this invention.

Having described my invention, what I claim is—

1. The combination with an irrigating-tube provided in its bottom with outlet-perforations, of a perforated receptacle normally located in the tube near and out of contact with its bottom, and adapted to be withdrawn to remove accumulations of dirt gaining access to the interior of the tube, substantially as specified.

2. The combination with an irrigating-tube having outlet-perforations, of a receptacle normally arranged in the tube near its bottom and provided with side and bottom perforations, and a stem or rod attached to the receptacle and extending to a point contiguous to the top of the tube, substantially as specified.

3. An irrigating device comprising a tube provided with outlet-perforations and having, near the plane of its bottom, a support, and a receptacle normally arranged upon said support with its bottom out of contact with that of the tube and provided with perforations to allow the contents of the tube to pass therethrough, and means, as a rod or stem, whereby the receptacle may be withdrawn from the tube, substantially as specified.

4. An irrigating device comprising a tube provided with outlet-perforations and having, at its upper end, a shoulder or enlargement to facilitate withdrawal thereof from the soil, a hinged lid or cover for normally closing the upper end of the tube, and a receptacle or bucket removably fitted in the tube and provided with a rod or stem terminating near the plane of the top or cover, substantially as specified.

In testimony that I claim the foregoing as my own I have hereto affixed my signature in the presence of two witnesses.

HERMAN KLING.

Witnesses:
W. M. BICKFORD,
A. B. LINN.